United States Patent [19]

Wolf et al.

[11] Patent Number: 5,080,171
[45] Date of Patent: Jan. 14, 1992

[54] METHOD OF TREATING SUBTERRANEAN FORMATION WITH A COMPOSITION OF IMPROVED VISCOSITY CONTROL

[75] Inventors: Richard A. Wolf; Thomas L. Staples, both of Midland, Mich.

[73] Assignee: The Dow Chemical Company, Midland, Mich.

[21] Appl. No.: 610,646

[22] Filed: Nov. 8, 1990

[51] Int. Cl.$^5$ .................................... E21B 43/267
[52] U.S. Cl. ............................. 166/300; 166/305.1; 166/308; 252/8.551
[58] Field of Search ............ 166/270, 271, 300, 305.1, 166/308; 252/8.551

[56] References Cited

U.S. PATENT DOCUMENTS

| | | | |
|---|---|---|---|
| 3,024,191 | 3/1962 | Jones | 252/8.551 X |
| 3,167,510 | 1/1965 | Alter | 252/8.551 |
| 3,818,991 | 6/1974 | Nimerick | 166/283 |
| 4,237,975 | 12/1980 | Scherubel | 166/308 X |
| 4,519,455 | 5/1985 | Holtmyer et al. | 166/308 X |
| 4,552,674 | 11/1985 | Brown et al. | 252/8.551 |
| 4,946,604 | 8/1990 | Smith | 252/8.551 |
| 4,969,526 | 11/1990 | Cawiezel | 166/300 |

Primary Examiner—George A. Suchfield

[57] ABSTRACT

Nitrogen containing free radical sources such as diazenes are useful as breakers in fracturing fluids used in the recovery of oil and gas from subterranean formations.

7 Claims, No Drawings

METHOD OF TREATING SUBTERRANEAN FORMATION WITH A COMPOSITION OF IMPROVED VISCOSITY CONTROL

BACKGROUND OF THE INVENTION

This invention is related to methods of controlling viscosity in the practice of fracturing subterranean formations, particularly as is done in the oil and gas industry.

Fluids exhibit a measurable property known as viscosity, a term which may be broadly defined as the internal friction or molecular attraction of a given material which manifests itself in resistance to flow. It is measured in liquids by standard test procedures and is often expressed in centipoises at a specified temperature and optionally other conditions. The viscosity of a liquid is an indication of a number of behavior patterns of the liquid at a given temperature including pumping characteristics, rate of flow, wetting properties and a tendency or capacity to suspend an insoluble particulate material therein.

A particular need exists for control of viscosity in the practice of fracturing subterranean formations such as is done in the oil and gas industry. A fracturing fluid (usually a liquid, but occasionally some gas will be present), having granular particulate material suspended or slurried therein, is injected down a well to penetrate the formation and is forced back into the formation. Typically, the height of the hydraulic head of liquid is used to provide added pressure and hence this process is sometimes called hydraulic fracturing. The injection of this fluid causes the formation to crack or fracture, thereby permitting oil or gas in the formation to move more easily to the producing well. Fracturing usually employs oil, water or an emulsion thereof which has suspended therein particles which are usually insoluble in the liquid and the fluids of the formation. At least a portion of the particles generally lodge in the fractures created in the formation, thus propping the fractures open. This keeps the fractures open when the pressure is released and the well put back into production.

One of the problems of fracturing fluids is the tendency of the particulate proppants to settle out of the fluid prematurely and thus not be available to prop the fractures open at distances removed from the injection well. One approach to solving this problem is to thicken or gel the fracturing fluid so that it holds the proppants in place. This can result in an additional problem since it is difficult to remove the thickened fracturing fluid from the formation.

It is known to use "breakers" with fracturing fluids. The breakers reduce the viscosity of the fluid at the appropriate time so that the proppant is available to hold open the fractures in the formation. The breaker then permits the fluid to thin enough to be easily removed from the formation while leaving the proppant behind. For example, U.S. Pat. No. 3,818,991 to Nimerick, dated June 25, 1974, teaches the use of a fracturing composition containing a water soluble hydrazine or hydroxylamine to decrease the viscosity at a given time. U.S. Pat. No. 4,552,674 to Brown et al., dated Nov. 12, 1985, teaches the use of peroxygen compounds capable of generating free radicals at the appropriate time to decrease the composition viscosity. Other references teach the use of persulfates.

Certain problems associated with the use of breakers to decrease viscosity of fracturing fluids after the fluids have delivered the proppants to the formation remain. The breaker must be stable under the conditions at which the fracturing fluid is delivered to the formation and must quickly become available once the proppant is in place so that the fracturing fluid thins enough to be removed. There remains a need for breaker fluids to meet these criteria under the various environmental conditions existing in subterranean formations where oil and gas are found.

SUMMARY OF THE INVENTION

In one aspect, the present invention is an aqueous composition, comprising a water soluble organic polymer and optionally a proppant, useful as a fracturing fluid in subterranean formations wherein the fluid is improved by the use of a water soluble or water dispersible nitrogen containing free radical source, selected from the group consisting of diazenes, amine oxides and nitroxides.

In a second aspect, this invention is an improved process for treating a subterranean formation by contacting said formation with an aqueous composition comprising a water soluble organic polymer; permitting the aqueous composition to remain in contact with the formation for a period of time; and then removing the aqueous composition from the formation. The improvement is the use in the aqueous composition of an amount of a water soluble or water dispersible nitrogen containing free radical source, selected from the group consisting of diazenes, amine oxides and nitroxides, sufficient to decrease the viscosity of the thickened aqueous solution prior to removing the aqueous solution from the formation.

It is the surprising result of the present invention that the viscosity of the aqueous composition is maintained at a level sufficient to deliver a proppant to the subterranean formation and then is effectively broken or decreased to allow the composition to flow out of the formation. The nitrogen containing free radical sources useful in the present invention are not as susceptible to environmentally induced decompositions as are the peroxides and persulfates currently used. Therefore, they are useful in the highly varying environments of subterranean formations.

DETAILED DESCRIPTION OF THE ILLUSTRATIVE EMBODIMENTS

The nitrogen containing free radical sources useful in the present invention include diazenes, amine oxides and nitroxides. In one preferred embodiment, diazenes useful in the present invention correspond to the formula:

$$R^1-N=N-R^2$$

wherein $R^1$ and $R^2$ are independently in each occurrence a $C_{1-10}$ alkyl group or an aromatic group with the proviso that at least one of $R^1$ and $R^2$ is an alkyl group. The alkyl groups may be substituted or unsubstituted. Non-limiting examples of suitable substituents include halo, hydroxy, methoxy, acetoxy, amino, sulfhydrylcarboxyl and cyano. The aromatic groups may be substituted or unsubstituted and preferably include phenyl, napthyl, pyridyl and furanyl which are either unsubstituted or contain substituents selected from the group comprising halo, hydroxy, methoxy, acetoxy, amino, sulfhydrylcarboxyl and cyano.

In another preferred embodiment, diazenes useful in the present invention correspond to the formula:

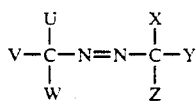

wherein U, V, W, X, Y, and Z are independently in each occurrence hydrogen, $C_{1-10}$ alkyl, aryl, halo, hydroxy, methoxy, ethoxy, amino, monoalkylamine, dialkylamine, monoarylamino, diarylamino, sulfydryl, alkylsulfidy, arylsulfiyl, cyano, isocyanyl, carboxyl, carboxyl ester, carboxyl amide, carbamoyl, silyl, phosphonyl and sulfuryl.

In a third preferred embodiment, the nitrogen containing free radical source is an amine oxide corresponding to the formula

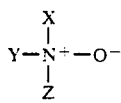

wherein X, Y, and Z are independently in each occurrence hydrogen, $C_{1-10}$ alkyl, aryl, halo, hydroxy, methoxy, ethoxy, amino, monoalkylamine, dialkylamine, monoarylamino, diarylamino, sulfydryl, alkylsulfidy, arylsulfiyl, cyano, isocyanyl, carboxyl, carboxyl ester, carboxyl amide, carbamoyl, silyl, phosphonyl and sulfuryl.

In a fourth preferred embodiment, the nitrogen containing free radical source is a nitroxide corresponding to the formula

wherein X and Y are independently in each occurrence hydrogen, $C_{1-10}$ alkyl, aryl, halo, hydroxy, methoxy, ethoxy, amino, monoalkylamine, dialkylamine, monoarylamino, diarylamino, sulfydryl, alkylsulfidy, arylsulfiyl, cyano, isocyanyl, carboxyl, carboxyl ester, carboxyl amide, carbamoyl, silyl, phosphonyl and sulfuryl.

Non-limiting examples of preferred nitrogen containing free radical sources include: 2,2'-azobisisobutyronitrile; di-tert-butyl diazene; 2,2'-azobis-(2-amidinopropane)-dihydrochloride; 2,2'-azobis(4-methoxy-2,4-dimethylvaleronitrile); 2,2'-azobis(2,4-dimethylvaleronitrile); (1-phenylethyl)azodiphenylmethane; dimethyl 2,2'-azobis isobutyrate; 2,2'azobis(2-methylbutyronitrile); 1,1'-azobis(1-cyclohexane carbonitrile); 2-(carbonoylazo)-isobutyronitrile; 2,2'-azobis(2,4,4-trimethylpentane); 2-phenylazo-2,4-dimethyl-4-methoxy valeronitrile; 4,4'-azobis(4-cyanopentanoic acid); 2,2'-azobis(N,N'-dimethylene isobutyramidine); 2,2'-azobis(N,N'-dimethylene isobutyramidine)dihydrochloride.

Any polymer which is water-dispersible and forms a pumpable gel or otherwise viscous system having suspending properties in water may be employed in the practice of this invention. Such polymers include (1) acrylamide polymers which may be linear polyacrylamide, acrylamide polymers cross-linked with a limited amount of a cross-linking agent and acrylamide copolymers prepared by copolymerizing acrylamide with a minor proportion of a monomer copolymerizable therewith such as vinylbenzylsulfonate or vinylbenzenesulfonate; (2) polyvinylpyrrolidone; (3) polyvinylmorpholinone; (4) cellulosic polymers and derivatives thereof; (5) natural gums such as guar, tragacanth, Irish moss, soy bean and modified starches such as those disclosed in Davidison-Sittig, *Water Soluble Resins*, pp. 13–49, 2nd Ed. (1962); and (6) water soluble alkaline metal salts of such polymers, copolymers and gums. For simplicity of expression all such polymeric species will be referred to herein as polymers.

The polymers useful in this process are water soluble, organic polymers, sometimes referred to as hydrophilic polymeric colloids. The term "water-soluble" as employed in the foregoing technology, means dispersible in water to provide a visually homogeneous system. Such polymers are usually essentially linear or branched in structure, but may be to some extent cross-linked so long as the polymer is effectively swollen by and uniformly dispersed in water.

The polymers described above as useful in the practice of the present invention are well known in the art. They are either commercially available or methods for their production are well known.

The polymers used in the practice of this invention may also contain stabilizers, viscosity increasing agents and other additives known in the art.

The nitrogen containing free radical source useful in the practice of this invention will be employed in an amount sufficient to decrease the viscosity of the aqueous composition to about thirty centipoise or less. The viscosity will preferably be reduced to about ten, more preferably about five and most preferably about one centipoise. This reduction in viscosity will be accomplished within a time period of about five minutes to about 24 hours under the conditions of use of the fracturing fluid. As will be recognized by one skilled in the art, the appropriate amount of nitrogen containing free radical source will depend on a variety of factors including, but not limited to, the temperature and pressure of the subterranean formation, the amount of time that it will take the aqueous composition to be pumped to the formation, the pH, the amount and type of polymers used and the amount and type of stabilizers used. Another desirable feature of this invention is the ability to achieve a desired rate of free radical production from the nitrogen-containing compounds of this invention at predictable temperatures by varying the groups $R^1$, $R^2$, U, V, W, X, Y and Z (above) for a given formulation.

The following examples are provided to illustrate the invention, but should not be considered as limiting it in any way. Unless stated otherwise, all amounts and percentages are by weight.

EXAMPLE 1

Aqueous solutions (deionized water) of 0.5 weight percent nonionic, precipitated, emulsion-polymerized, high molecular weight polyacrylamide are prepared. Sodium thiosulfate is added to the solutions as a stabilizer in the amounts indicated in Table I below. Di-tert-butyl diazene is added in the amounts indicated in Table I below. The reaction solutions are pipetted into six inch by ⅜ inch stainless steel pipe bombs with stainless steel screw caps which are tightly attached. The pipe bombs filled ⅔ full with reaction solutions are inserted into a temperature-regulated oil bath, fitted with a rocking device for tipping the pipe bombs end to end continuously during heating. The oil bath is heated to 195° C. Viscosities are measured by a Brookfield Viscometer and are corrected for shear.

TABLE I

EFFECT OF STABILIZER AND BREAKER (di-tert-butyl diazene) ON VISCOSITY OF 0.5% AQUEOUS POLYACRYLAMIDE. ALL SOLUTIONS HEATED AT 195° C.

| Run | Heating Time (min) | di-t-butyldiazene ppm | Sodium Thiosulfate | Final Viscosity Cp. 25° C. |
|---|---|---|---|---|
| 1[1] | 0 | 0 | 0 | 64 |
| 2[1] | 182 | 0 | 0 | 8 |
| 3[1] | 260 | 0 | 530 | 48 |
| 4 | 182 | 4500 | 460 | 57 |
| 5 | 302 | 4900 | 480 | 3 |
| 6 | 80 | 4500 | 460 | 59 |
| 7 | 290 | 420 | 530 | 56 |
| 8 | 242 | 385 | 190 | 28 |

[1]Not an embodiment of the invention.

The data in Table I above shows that the polyacrylamide of the present invention required sodium thiosulfate as a stabilizer (see Runs 1 and 2 where viscosity drops dramatically upon heating in the absence of the stabilizer). Run 3 shows that viscosity remains relatively stable upon heating in the presence of the stabilizer and absence of the diazene. Runs 4, 5 and 6 demonstrate that the stabilized polyacrylamide remains stable upon heating through an induction period, but when heated long enough, viscosity falls dramatically. Runs 7 and 8 show that the dosages of both di-tert-butyl diazene and the stabilizer may be modified to obtained the desired result.

EXAMPLE 2

The procedure outlined in Example 1 was followed with the exception that no stabilizer was used since the oil bath was heated only as high as 90° C., at which the polyacrylamide is stable in the absence of a stabilizer for periods greater than two and one/half hours. In this example, 2,2'-azobis-(2-amidinopropane)dihydrochloride is added in the amounts specified in Table II below.

TABLE 3

EFFECT OF 2,2'-AZOBIS(2-AMIDINOPROPANE) HYDROCHLORIDE ON THE VISCOSITY OF 0.5 PERCENT AQUEOUS POLYACRYLAMIDE

| Run | Temperature °C. | Heat Time (min) | Diazene (ppm) | Viscosity at 25° C., Cp |
|---|---|---|---|---|
| 1[1] | 25 | 0 | 0 | 122 |
| 2[1] | 90 | 150 | 0 | 122 |
| 3 | 90 | 150 | 125 | 10 |
| 4 | 70 | 0 | 125 | 100 |
| 5 | 70 | 20 | 125 | 78 |
| 6 | 70 | 40 | 125 | 31 |
| 7 | 70 | 75 | 125 | 12 |
| 8 | 70 | 40 | 63 | 52 |
| 9 | 70 | 40 | 250 | 18 |

[1]Not an embodiment of the invention

The data in Table II above shows that 2,2'-azobis-(2-amidinopropane)-dihydrochloride can be an effective breaker at the temperatures indicated. Runs 1 and 2 show that the polyacrylamide is stable at temperatures up to 90° C. for longer than 2.5 hours. Runs 8 and 9 indicate the effects of dosage of the diazene. Runs 4 through 7 show that a ten fold decrease in viscosity is achieved under specified conditions.

What is claimed is:

1. An process for treating a subterranean formation by contacting said formation with an aqueous composition comprising a water soluble organic polymer; permitting the aqueous composition to remain in contact with the formation for a period of time; and then removing the aqueous composition from the formation, the improvement comprising the use, in the aqueous composition, of an amount of a water soluble free radical source, selected from the group consisting of diazenes, amine oxides and nitroxides, sufficient to decrease the viscosity of the thickened aqueous solution prior to removing the aqueous solution from the formation.

2. The process of claim 1 wherein the free radical source is a diazene.

3. The process of claim 2 wherein the diazene is selected from the group consisting of 2,2'-azobisisobutyronitrile; di-tert-butyl diazene; 2,2'-azobis-(2-amidinopropane)-dihydrochloride; 2,2'-azobis(4-methoxy-2,4-dimethylvaleronitrile); 2,2'-azobis(2,4-dimethyl-valeronitrile); (1-phenylethyl)azodiphenylmethane; dimethyl 2,2'-azobis isobutyrate; 2,2'azobis(2-methylbutyronitrile), 1,1'-azobis(1-cyclohexane carbonitrile); 2-(carbonoylazo)-isobutyronitrile; 2,2'-azobis(2,4,4-trimethylpentane); 2-phenylazo-2,4-dimethyl-4-methoxy valeronitrile; 4,4'-azobis(4-cyanopentanoic acid); 2,2'-azobis(N,N'-dimethylene isobutyramidine); 2,2'-azobis(N,N'-dimethylene isobutyramidine)dihydrochloride.

4. The process of claim 3 wherein the diazene is selected from the group consisting of di-tert-butyl diazene and 2,2'-azobis-(2-amidinopropane)-dihydrochloride.

5. The process of claim 1 wherein the free radical source is an amine oxide.

6. The process of claim 1 wherein the free radical source is a nitroxide.

7. The process of claim 6 wherein the nitroxide is di-tert-butyl nitroxide.

* * * * *